(12) United States Patent
Vogli et al.

(10) Patent No.: US 12,403,546 B2
(45) Date of Patent: Sep. 2, 2025

(54) ULTRASONIC ADDITIVE MANUFACTURING OF CLADDED AMORPHOUS METAL PRODUCTS

(71) Applicants: LM Group Holdings, Inc., Lake Forest, CA (US); Fabrisonics LLC, Columbus, OH (US)

(72) Inventors: Evelina Vogli, Lake Forest, CA (US); John Kang, Lake Forest, CA (US); Ricardo Salas, Lake Forest, CA (US); Adam Hehr, Columbus, OH (US)

(73) Assignees: LM Group Holdings, Inc.; Fabrisonics LLC

( * ) Notice: Subject to any disclaimer, the term of this patent is extended or adjusted under 35 U.S.C. 154(b) by 378 days.

(21) Appl. No.: 18/173,830

(22) Filed: Feb. 24, 2023

(65) Prior Publication Data
US 2023/0191527 A1    Jun. 22, 2023

Related U.S. Application Data

(63) Continuation of application No. 16/834,201, filed on Mar. 30, 2020, now Pat. No. 11,628,513.
(Continued)

(51) Int. Cl.
    *B23K 20/10*    (2006.01)
    *B23K 20/227*   (2006.01)
    (Continued)

(52) U.S. Cl.
    CPC ............ *B23K 20/10* (2013.01); *B23K 20/106* (2013.01); *B23K 20/227* (2013.01);
    (Continued)

(58) Field of Classification Search
    None
    See application file for complete search history.

(56) References Cited

U.S. PATENT DOCUMENTS

| 2014/0312098 A1* | 10/2014 | Hofmann | B23K 20/103 |
| | | | 228/110.1 |
| 2016/0023438 A1* | 1/2016 | Johnson | C22C 45/02 |
| | | | 148/536 |

(Continued)

FOREIGN PATENT DOCUMENTS

| CN | 102407402 A | * | 4/2012 | ............ B23K 20/10 |
| CN | 104353930 A | * | 2/2015 | ............ B23K 20/10 |

(Continued)

OTHER PUBLICATIONS

Zhengquiang—CN 102407402 A—'897 non-final rej—MT—non-crystal ultrasonic welding—2012 (Year: 2012).*
(Continued)

*Primary Examiner* — John Vincent Lawler
(74) *Attorney, Agent, or Firm* — Raj S. Davé; Davé Law Group, LLC

(57) ABSTRACT

An embodiment relates to an ultrasonic additive manufacturing process, comprising joining a foil comprising a bulk metallic glass to a substrate; and forming a cladded composite comprising the foil and the substrate; wherein a thickness of the cladded composite is greater than a critical casting thickness of the bulk metallic glass, wherein the cladded composite comprises a cladding layer of the bulk metallic glass on the substrate and the bulk metallic glass comprises approximately 0% crystallinity, approximately 0% porosity, less than 50 MPa thermal stress, approximately 0% distortion, approximately 0 inch heat affected zone, approximately 0% dilution, and a strength of about 2,000-3,500 MPa.

18 Claims, 13 Drawing Sheets

Related U.S. Application Data

(60) Provisional application No. 62/826,630, filed on Mar. 29, 2019.

(51) Int. Cl.

| | |
|---|---|
| B23K 20/233 | (2006.01) |
| B23K 20/24 | (2006.01) |
| B23K 26/00 | (2014.01) |
| B23K 26/0622 | (2014.01) |
| B23K 26/352 | (2014.01) |
| B32B 7/04 | (2019.01) |
| B32B 15/01 | (2006.01) |
| B32B 15/04 | (2006.01) |
| B32B 15/20 | (2006.01) |
| C22C 1/11 | (2023.01) |
| C22C 9/00 | (2006.01) |
| C22C 14/00 | (2006.01) |
| C22C 16/00 | (2006.01) |
| C22C 19/05 | (2006.01) |
| C22C 45/00 | (2023.01) |
| C22C 45/10 | (2006.01) |
| C23C 4/00 | (2016.01) |
| C23C 4/04 | (2006.01) |
| C23C 4/067 | (2016.01) |
| C23C 4/08 | (2016.01) |
| C23C 4/12 | (2016.01) |
| C23C 4/137 | (2016.01) |
| C23C 28/00 | (2006.01) |
| C23C 28/02 | (2006.01) |
| C23C 30/00 | (2006.01) |
| B23K 103/04 | (2006.01) |
| B23K 103/08 | (2006.01) |
| B23K 103/10 | (2006.01) |
| B23K 103/14 | (2006.01) |
| B23K 103/18 | (2006.01) |
| B33Y 10/00 | (2015.01) |
| B33Y 70/00 | (2020.01) |
| B33Y 70/10 | (2020.01) |
| B33Y 80/00 | (2015.01) |

(52) U.S. Cl.
CPC ........ *B23K 20/233* (2013.01); *B23K 20/2333* (2013.01); *B23K 20/24* (2013.01); *B23K 26/0006* (2013.01); *B23K 26/0622* (2015.10); *B23K 26/352* (2015.10); *B32B 7/04* (2013.01); *B32B 15/013* (2013.01); *B32B 15/017* (2013.01); *B32B 15/04* (2013.01); *B32B 15/043* (2013.01); *B32B 15/20* (2013.01); *C22C 1/11* (2023.01); *C22C 9/00* (2013.01); *C22C 14/00* (2013.01); *C22C 16/00* (2013.01); *C22C 19/058* (2013.01); *C22C 45/008* (2013.01); *C22C 45/10* (2013.01); *C23C 4/00* (2013.01); *C23C 4/04* (2013.01); *C23C 4/067* (2016.01); *C23C 4/08* (2013.01); *C23C 4/12* (2013.01); *C23C 4/137* (2016.01); *C23C 28/02* (2013.01); *C23C 28/021* (2013.01); *C23C 28/026* (2013.01); *C23C 28/40* (2013.01); *C23C 30/00* (2013.01); *C23C 30/005* (2013.01); *B23K 2103/04* (2018.08); *B23K 2103/08* (2018.08); *B23K 2103/10* (2018.08); *B23K 2103/14* (2018.08); *B23K 2103/18* (2018.08); *B32B 2307/702* (2013.01); *B32B 2311/18* (2013.01); *B32B 2311/24* (2013.01); *B32B 2311/30* (2013.01); *B33Y 10/00* (2014.12); *B33Y 70/00* (2014.12); *B33Y 70/10* (2020.01); *B33Y 80/00* (2014.12); *Y10T 428/12736* (2015.01); *Y10T 428/12743* (2015.01); *Y10T 428/1275* (2015.01); *Y10T 428/12806* (2015.01); *Y10T 428/12812* (2015.01); *Y10T 428/12868* (2015.01); *Y10T 428/12917* (2015.01); *Y10T 428/12972* (2015.01); *Y10T 428/12979* (2015.01); *Y10T 428/24942* (2015.01); *Y10T 428/2495* (2015.01); *Y10T 428/24959* (2015.01); *Y10T 428/24967* (2015.01); *Y10T 428/26* (2015.01); *Y10T 428/263* (2015.01); *Y10T 428/264* (2015.01); *Y10T 428/265* (2015.01)

(56) References Cited

U.S. PATENT DOCUMENTS

| | | |
|---|---|---|
| 2018/0339338 A1 | 11/2018 | Hofmann et al. |
| 2019/0232430 A1 | 8/2019 | Gong et al. |

FOREIGN PATENT DOCUMENTS

| | | | | |
|---|---|---|---|---|
| CN | 106862748 A | * | 6/2017 | ........... B23K 20/103 |
| CN | 107498173 A | | 12/2017 | |
| EP | 3444370 A1 | * | 2/2019 | ........... B22D 21/025 |
| KR | 100549997 B1 | | 2/2006 | |
| WO | 2018089080 A1 | | 5/2018 | |

OTHER PUBLICATIONS

Lee—CN 104353930 A—'201 non-final rej—MT—ultrasonic amorphous—2015 (Year: 2015).*
Wang—CN 106862748 A—'201+'897 non-final rej—MT—ultrasonic add.man. amorphous on metal—2017 (Year: 2017).*
Li—Zr-based bulk metallic glass via add.manuf.—IDS—Mat.Sci. Eng.—(Nov. 2018)—2019 (Year: 2019).*
Busch—EP 3444370 A1—MT—Cu—Zr compositions for metallic glasses—Feb. 2019 (Year: 2019).*
S. Saunders, "NC State Researchers Successfully 3D Print Metallic Glass Alloys in Bulk," Mar. 23, 2018, 5 pages.
S. Saunders, "Exmet AB's Amorphous Metals 3D Printing Technology Receives Investment Boost from AM Ventures, Accelerating Commercialization," Mar. 27, 2017, 5 pages.
Y. Li, Y. Shen, M. Leu and H. Tsai, "Mechanical properties of Zr-based bulk metallic glass parts fabricated by laser-foil-printing additive manufacturing," Materials Science and Engineering A, pp. 404-411, 2019, 1 page.
D. Hofmann, P. Bordeenithikasem, Z. Dawson, L. Hamill, R. Dillon, B. McEnerney, S. Nutt and S. Bradford, "Investigating bulk metallic glasses as ball-and-cone locators for spacecraft deployable structures," Aerospace Science and Technology, vols. 82-83, pp. 513-519, Nov. 2018, 7 pages.
M.D. Demetriou, M.E. Launey, G. Garrett, J.P. Schramm, D.C. Hofmann, W.L. Johnson, R.O. Ritchie: A damage-tolerant glass, Nature Materials 10 (2011) 123-128, 1 page.
D. Hofman, P. Bordeenithikasem, S. Robers and A. Pate, "3D Printing of Bulk Metallic Glasses: Is it a Rebirth or the End of BMG Research," in TMS 2019, 2019.

* cited by examiner

ULTRASONIC ADDITIVE MANUFACTURING OF CLADDED AMORPHOUS METAL PRODUCTS

RELATED APPLICATION

The present application is a continuous application of U.S. Ser. No. 16/834,201, entitled "ULTRASONIC ADDITIVE MANUFACTURING OF CLADDED AMORPHOUS METAL PRODUCTS" filed on Mar. 30, 2020, that claims priority to U.S. Provisional Application No. 62/826,630, entitled "CLADDED AMORPHOUS METAL PRODUCTS" filed on Mar. 29, 2019, of which are incorporated herein by reference in its entirety.

FIELD OF THE INVENTION

This invention relates to the process of preparing cladded surfaces for generating functional surfaces including wear, corrosion and erosion resistance functionalities. The invention is more particularly concerned with a process involving amorphous material alloys and ultrasonic processing.

BACKGROUND OF INVENTION

Amorphous materials are often not considered in engineering applications due to their low fracture toughness, difficulty in joining to other materials, and structure scale-up challenges. In addition, several methods, processes and materials have been used to manufactured cladded surfaces including roll bonding, co-extrusion, weld overlay and laser cladding. They are not only labor and time intensively, but also may have difficulties to achieve the desired specifications.

In the past two or three years, a number of additive manufacturing (AM) technologies have shown the ability to produce amorphous metal structures due to high cooling rates in melt pools or low processing temperatures.

Processing of novel materials, manufacturing complex-shaped parts, reduction in part manufacturing, reduction in finishing time, and lowering the cost are the drivers for using AM. AM is particularly suitable for the manufacture of products with complex features using traditionally difficult-to-process materials without the use of traditional tools, such as molds or dies. AM, also referred to as 3D printing, is a cladding layer-by-layer technique of producing three-dimensional (3D) objects directly from a digital model. AM has become a very disruptive field in the manufacturing sector and continues to grow in use.

This manufacturing disruption is allowing scale-up and creation of complex amorphous structures outside of traditional casting methods. Consequently, amorphous alloy use is actively expanding into new application areas which were previously deemed impossible. However, the ductility and fracture toughness of printed and cast amorphous alloys remains subpar of many crystalline metals, which continues to limit use in many engineering applications. By mixing amorphous alloys with other metals with high ductility and fracture toughness, these limitations may be overcome.

BMG laminate composites have been created in prior art, yet these are epoxy based structures. Epoxy is unfavorable for extreme temperature conditions, which is where many BMGs are used. Additionally, these epoxy joints do not hold-up to high cycling and loading due to poor bond strength (obtained from Aerospace Science and Technology, Vols. 82-83, pp. 513-519, November 2018). The ball and cone locator are used for docking and moving things around in low earth orbits and space. For low earth orbits, low melting point materials are of interest such that materials burn-up or disperse during re-entry to earth. This greatly minimizes the risk of solid's entering and potentially causing damage, i.e., steels and titanium alloys. Consequently, BMGs are of interest to replace titanium ball and cone locators due to their high hardness and low melting point. However, the bond strength with epoxy is not adequate. A solution to this bond problem would be to replace the body of the cone with aluminum and use BMGs only on the cone face.

Currently cladding of surfaces with BMGs currently does not use metallic joining as the mechanism. Instead, mechanical interlocking is used by depositing BMG droplets via cold spray onto a mechanically roughened surface. This mechanical interlocking has limitations in its operating temperature and strength, similar to epoxy. By replacing this bond with a metallurgical one, operating temperature and strength becomes less of a concern.

Out of the available additive technologies for BMG production, Ultrasonic Additive Manufacture (UAM) has the lowest processing temperature, which in turn allows the creation of dissimilar or multi-metal structures since solidification is absent and high temperature chemistry and diffusion are suppressed. UAM is frequently used to create dissimilar metal laminate composites or clad metal surfaces due to these attributes. Dissimilar metal composites created using UAM are frequently composed of a soft ductile material and a harder brittle material to create tailorable mechanical response and failure behavior. Similarly, cladding of surfaces often begins by joining hard, wear-resistant metals to softer underlying structure. Cladding of hard metals to hard metals has also been achieved but is less commonly encountered.

Amorphous metals are a new class of materials that have a disordered, non-crystalline, glassy structure, lacking long-range periodicity of the atomic arrangement, that are created when metals or their alloys are either cooled very quickly or because of a unique alloy combination, bypassing crystallization during solidification. FIG. 1 shows the time-temperature-transformation (TTT) solidifying diagram of an exemplary amorphous and a crystalline alloy. The C shape of crystalline materials in TTT diagram is the result of the competition between the increasing driving force for crystallization and the slowing of kinetics (effective diffusivity) of the atoms. Both thermodynamic and kinetic parameters affect the crystallization and shift the C shape position to larger times.

The position of the nose determines the critical cooling rate to avoid nucleation and crustal growth during cooling and defines the conditions to manufacture amorphous alloys. In case of amorphous alloys instead of liquid/solid crystallization transformation, the molten material becomes more viscous as the temperature reduces near to the glass transformation temperature and transforms to a solid state after this temperature. In the liquid state, the atoms vibrate around positions and have no long-range ordering. Hence, the critical cooling rate is determined by atomic fluctuations, controlled by thermodynamic factor, rather than kinetic factor. Due to the crystallization bypass, the amorphous alloys remain the most prominent characteristics of the liquids, the absence of typical long-range ordered pattern of the atomic structure of crystalline alloys and any defects associated with it. This disordered, dense atomic arrangement determines the unique structural and functional properties of amorphous alloys.

Due to their unique microstructure, amorphous metals combine high corrosion resistance, high strength, high hardness and substantial ductility in one single metal. The unique properties or amorphous metals comes from the lack of long-range periodicity, related grain boundaries and crystal defects such as dislocations. There has been a limitation regarding manufacturing net-shape components with Amorphous Metals until only recently with the additive manufacturing. Traditionally, components were limited in thickness to 3-5 mm due to the fast cooling rate requirement of the alloy (critical casting thickness).

Amorphous materials are often not considered in engineering applications due to their low fracture toughness, difficulty in joining to other materials, and structure scale-up challenges. In addition, several methods, processes and materials have been used to manufactured cladded surfaces including roll bonding, co-extrusion, weld overlay and laser cladding. They are not only labor and time intensively, but also may have difficulties to achieve the desired specifications.

Additive manufacturing has remedied some of these challenges by enabling more complex features and larger structures above the critical casting thickness. Yet, printed structures demonstrate lower ductility and fracture toughness due to micro defects from printing. This decrease in fracture toughness creates pause for design engineers, which ultimately influences BMG use. Applicant believes this decrease in fracture toughness and ductility can be overcome by mixing cast BMG foils with more ductile alloys, i.e., form a metallic composite.

The UAM process works by building up solid metal objects through ultrasonically welding a succession of metal tapes or foils into a 3D shape, with periodic machining operations to create the detailed features of the resultant object. The process creates a joint between the foils through plastic deformation and not heat. The bond zone is typically near 10 microns in size and composed of equiaxed recrystallized grains when joining similar metals. For dissimilar metal joints, the bond zone is sub-micron in size and does not always contain new crystals. Due to the small bond zone relative to the foil stock size, bulk material property changes are negligible and identical to the incoming foil stock.

CN106862748A demonstrates amorphous/metal microlaminated composite material ultrasonic wave accumulation manufacture method, which includes extracting the individual-layer data, amorphous/metal foil is successively welded using ultrasonic consolidation technology in metal foil substrate to obtain amorphous/crystalline metal microlaminated composite.

US20190232430 A1 discloses additive manufacturing of amorphous alloy using laser 3D printing of an amorphous alloy foil using the amorphous alloy foil as a raw material. However, laser 3D printing is based on melting of amorphous foils to generate the bonding between the foils.

WO2018/089080 A1 describes an additive manufacturing system which uses a material joining laser system to join together foil sheets to form a metal part. The material joining laser system can be configured to join adjacent foil sheets together in a substantially uniform manner. A cooling system is required in this case to maintain the amorphous structure of the foils. In other cases, an amorphous based/crystalline composite will be generated.

KR100549997B1 discloses a method for manufacturing amorphous composite material consisting of an amorphous surface, and the surface of the amorphous base metal having a sufficient ductility and fracture toughness at low production cost. The amorphous surface of the composite material has good corrosion resistance, wear resistance, hardness and strength and the like useful in various industries. Since the processing is done at melting point through the electron beam, amorphous feedstock transforms to crystalline (either partially or fully) and generate composites with different amorphous portion.

US20180339338A1 describes method to use 3D printing of discrete thin layers during the assembly of bulk parts from metallic glass alloys with compositions selected to improve toughness at the expense of glass forming ability.

CN107498173 A discloses a laser-assisting type ultrasonic additive manufacturing device for a metallic foil tape and a manufacturing method which combines ultrasonic welding with laser processing.

In the embodiments herein, metallurgical bonding of the amorphous foil to the substrate is performed using ultrasonic additive manufacturing. The process creates a joint between the foils through plastic deformation. Since the processing is done at near room temperature, there are no transformation issues after build-up such in case of electron beam and no cooling is required to keep the amorphous structure.

SUMMARY OF INVENTION

An embodiment relates to a cladded surface such as metallic surface or the like using amorphous metallic alloys.

An embodiment includes method for manufacturing of amorphous metal alloy laminate composites and cladding of metallic surfaces by using ultrasonic additive manufacturing (UAM).

An embodiment includes a method for metallurgically bonding cladding material onto a metal substrate.

Such embodiment further includes the metallurgical bonding of the amorphous foil to the substrate using UAM.

In an embodiment, UAM process creates a joint between the foils through plastic deformation. The bond zone formed by joining similar metals is about 10 microns in size and composed of equiaxed recrystallized grains. The bond zone formed by joining dissimilar metal joints is about sub-micron (less than a micron) in size and does not always contain new crystals. Due to the small bond zone relative to the foil stock size, bulk material property changes are negligible and identical to the incoming foil stock.

An embodiment relates to creation of ductile and fracture resistant BMG structures via composite theory.

An embodiment relates to a cladded composite comprising at least a cladding layer of a bulk metallic glass and a substrate; wherein the bulk metallic glass comprises approximately 0-10% crystallinity, approximately 0% porosity, less than 50 MPa thermal stress, approximately 0% distortion, approximately 0 inch heat affected zone, approximately 0% dilution, and a strength of about 2,000-3,500 MPa.

In other embodiments, the bulk metallic glass comprises Zr, Cu; wherein the substrate comprises steel.

The bulk metallic glass further comprises Ni, Al.

The cladding layer has a thickness of about 0.07 mm to 0.35 mm.

The cladding layer comprises multiple sheets of the foil.

The bulk metallic glass comprises Zr, Cu, Ni, Al; wherein the substrate comprises aluminum.

The cladding layer comprises a foil having a foil thickness of about 100-200 μm; wherein the cladding layer has a thickness of about 0.2 mm to 0.6 mm.

The cladding layer comprises a foil having a foil thickness of about 100-300 μm; wherein the cladding layer has a thickness of about 0.1 mm to 0.4 mm.

The cladding layer comprises a foil having a foil thickness of about 100-300 μm; wherein the cladding layer has a thickness of about 0.2 mm to 0.8 mm.

The cladded composite comprises a bond layer comprising Ni.

The bulk metallic glass comprises Zr, Cu; wherein the substrate is titanium.

The cladding layer comprises a foil having a foil thickness of about 20-300 μm; wherein the cladding layer has a thickness of about 0.1 mm to 0.4 mm.

The bulk metallic glass further comprises Ni, Al; wherein the cladding layer comprises a foil having a foil thickness of about 20-300 μm; wherein the cladding layer has a thickness of about 0.5 mm to 2 mm.

The bulk metallic glass further comprises Ti, wherein the cladding layer comprises a foil having a foil thickness of about 20-300 μm; wherein the cladding layer has a thickness of about 0.09 mm to 0.45 mm.

The bulk metallic glass comprises Ni, Si; wherein the substrate is steel; wherein the cladding layer comprises a foil having a foil thickness of about 20-300 μm; wherein the cladding layer has a thickness of about 0.02 mm to 2 mm.

The bulk metallic glass comprises Co, Fe; wherein the substrate is steel; wherein the cladding layer comprises a foil having a foil thickness of about 20-300 μm; wherein the cladding layer has a thickness of about 0.075 mm to 0.375 mm.

The bulk metallic glass comprises Ti, Zr; wherein the substrate is aluminum; wherein the cladding layer comprises a foil having a foil thickness of about 20-300 μm; wherein the cladding layer has a thickness of about 0.07 mm to 0.7 mm.

The cladded composite further comprises an interlayer, wherein the interlayer and the substrate has a disjoint crystal of less than <1 micron in size.

The bulk metallic glass cladding comprises no or near zero crystallinity, no porosity, no thermal stress, no distortion, no heat affected zone and no dilution.

The bulk metallic glass comprises a first bulk metallic glass and the substrate comprises a second bulk metallic glass.

An embodiment relates to an ultrasonic additive manufacturing process, comprising: joining a foil comprising a bulk metallic glass to a substrate; and forming a cladded composite comprising the foil and the substrate.

In other embodiments:

The ultrasonic additive manufacturing process comprises an amplitude in range of 30 μm to 40 nm and a speed in range of 50 inch per minute to 150 inch per minute.

The substrate comprises Al, Ti, steel.

There is no interlayer is between the bulk metallic glass and the substrate.

There is an interlayer is between the bulk metallic glass and the substrate.

The bulk metallic glass and the substrate has an interface; wherein the interface is amorphous.

The bulk metallic glass and the substrate has an interface; wherein the interface has no Kikuchi pattern.

The ultrasonic additive manufacturing process further comprises modifying a surface of the foil; optionally removing a surface oxide layer of the foil; and forming a nascent contact of the foil with the substrate.

DETAILED DESCRIPTION

Definitions and General Techniques

Figure 1:
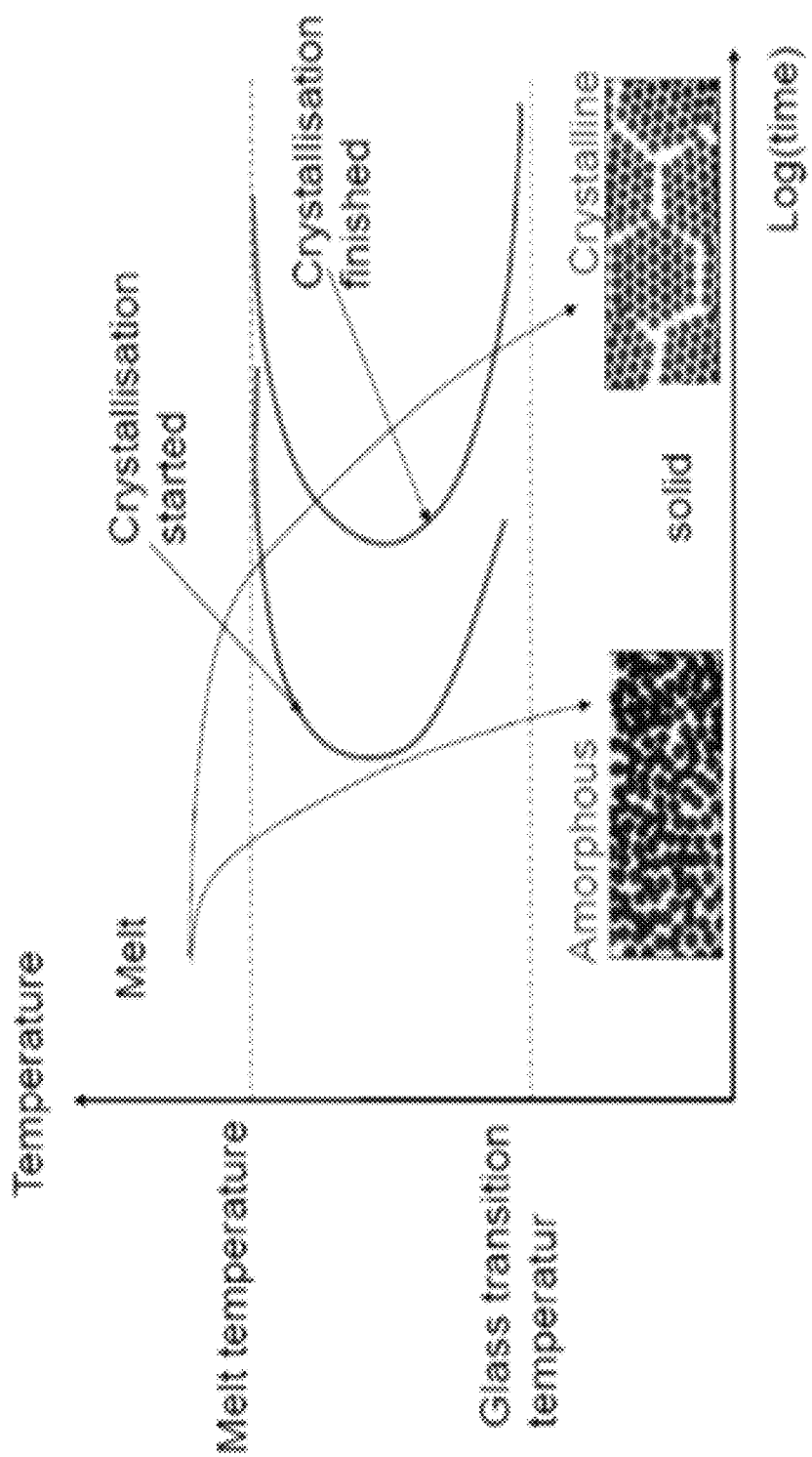
FIG. 1 shows a schematic Time-Temperature-Transformation (TTT) diagram that shows crystallization kinetics amorphous metals vs. crystalline metals.

The following description is made for the purpose of illustrating the general principles of the embodiments herein and is not meant to limit the inventive concepts claimed herein. Further, particular feature described herein can be used in combination with other described features in each of the various possible combinations and permutations.

It must also be noted that, as used in the specification and the appended claims, the singular forms "a," "an" and "the" include plural referents unless otherwise specified. Any ranges cited herein are inclusive.

The terms "substantially" and "about" and "near" and "approximate" used throughout this specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties, e.g., physical properties, then their crystalline counterparts. However, if the cooling rate is not sufficiently high, crystals may form inside the alloy during cooling, so that the unique benefits of the amorphous state can be lost. For example, one challenge with the fabrication of bulk amorphous alloy parts is the partial crystallization of parts due to either slow cooling or impurities prevalent in the raw alloy material. As a high degree of amorphicity (and, conversely, a low degree of crystallinity) is desirable in BMG parts, there is a need to develop methods for casting BMG parts having predictable and controlled amount of amorphicity. The terms "bulk metallic glass" ("BMG"), bulk amorphous alloy ("BAA"), and bulk solidifying amorphous alloy are used interchangeably herein.

Additive is something added to alter or improve the quality of an item.

The term "metal" or "metallic" refers to an electropositive chemical element.

Amorphous is defined as lacking in long-range order. It also characterized by random atomic orientation. It excludes partially crystalline and metastable crystalline metal alloys.

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared. Bulk-solidifying amorphous alloys, or bulk metallic glasses ("BMG") may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Cladding is defined as a process to enrich the surface properties of the material. The properties such as hardness, wear, and corrosion resistance are of major concerns in the various mechanical and tribological applications. During the cladding process, the surface is modified by the addition of a new layer with the desired powder materials.

The critical casting thickness is the maximum thickness that a BMG can be cast. This thickness is different for each BMG alloy composition. In embodiments herein, the BMG alloy has a thickness larger than its critical casting thickness.

Distortion means the change in shape.

Porosity or void fraction is a measure of the void (i.e. "empty") spaces in a material, and is a fraction of the volume of voids over the total volume, between 0 and 1, or as a percentage between 0% and 100%.

Heat affected zone is the region affected by change in temperature to a material.

Thermal Stress is stress created by any change in temperature to a material. These stresses can lead to fracture or plastic deformation depending on the other variables of heating, which include material types and constraints.

Dilution is the proportion of a base material from the substrate in the cladding layer material, Foil is defined as thin sheet of a material.

Interlayer is defined as the cladding layer situated between two layers.

Joint is defined as a place where two things or parts are joined or united; an area at which two ends, surfaces, or edges are attached.

Disjoint crystals are defined as crystals that are dislocated from each-other and do not have any contact point to each other Bond layer is a cladding layer of material designed to adhere another layer to a substrate.

Void is a pore that remains unfilled with polymer and fibers in a material. Voids are typically the result of poor manufacturing of the material and are generally deemed undesirable. Voids can affect the mechanical properties and lifespan of the composite. It is gaps or spaces which extend in the space between the top and bottom ends It is also defined as empty space, opening, gap, the quality of being without something.

Plastic is a material which, when subjected to compression at ambient temperatures, will flow before it will crack or break.

Interface is a surface regarded as the common boundary of two bodies, spaces, or phases. It is a general term to describe the connecting link between the two systems Transition is a passage from one state, condition, or place to another.

Lattice is a regular geometrical arrangement of points or objects over an area or in space.

Pulsed in a simple term is a load that requires intermittent pulses of power rather than a constant level of power.

Crystalline material is defined as a solid material whose constituents (such as atoms, molecules, or ions) are arranged in a highly ordered microscopic structure, forming a crystal lattice that extends in all directions. Crystals are also defined as crystalline material.

Composites is defined as a composite material (also called a composition material or shortened to composite, which is the common name) is a material made from two or more constituent materials with similar or different physical or chemical properties that, when combined, produce a material with characteristics different from the individual components. The individual components remain separate and distinct within the finished structure, differentiating composites from mixtures and solid solutions. Composite is made up of several parts or elements or, with respect to constructional material, made up of recognizable constituents.

Laminate is a material formed by bonding two or more materials together as in a pressure sensitive construction. Laminate and Composite may be used interchangeably throughput the specification.

An embodiment addresses the limitations of prior art that disclose high corrosion resistance, high toughness and high erosion resistance. The embodiments herein relate to a new class of materials said amorphous metals that offer high corrosion protection both under low and high temperatures. Further, the said material is designed in such a way that it does not increase the weight of the assembly.

In an embodiment, the cladded composite comprises a substrate and at least a cladding layer comprising a foil comprising a bulk metallic glass on the substrate; wherein the bulk metallic glass comprises approximately 0-10% crystallinity, approximately 0% porosity, less than 50 MPa thermal stress, approximately 0% distortion, approximately 0 inch heat affected zone, approximately 0% dilution, and a strength of about 2,000-3,500 MPa.

The bulk metallic glass comprises alloys based on Zr, Cu, Ni, Al, Ti, Hf, Si, B, C, P, Co, Fe, Mo, or combinations thereof.

The bulk metallic glass comprises alloys based on ZrCu, NiAl, ZrTi, NiCu, NiCuHf, NiAlTi, NiSi, BC, NiP, PC, CoFe, NiMo, BSi, or combinations thereof.

The substrate comprises steel, aluminum, titanium or combination thereof.

The foil has a foil thickness in a range of 5-1000 μm, 10-750 μm, 20-500 μm, 30-300 μm, 40-200 μm, 50-100 μm, or any combinations thereof.

The number of foils in the cladding layer could be 1-100, 2-75, 3-50, 4-40, 5-25, 6-60, 7-10 or any combinations thereof.

The cladding layer has a thickness in a range of about 0.05-5 mm, 0.1-2.5 mm, 0.15-1.5 mm, 0.2-1 mm, 0.25-0.8 mm, 0.3-0.7, 0.35-0.6 mm, 0.4-0.55 mm, 0.45-0.5 mm or any combinations thereof.

In an embodiment, UAM process to generate BMG composite and cladded structures while maintaining the amorphous microstructure.

In an embodiment, UAM process works by building up solid metal objects through ultrasonically welding a succession of metal tapes or foils or like into a 3D shape, with periodic machining operations to create the detailed features of the resultant object. The process creates a joint between the foils through plastic deformation and not heat.

In an embodiment, UAM creates a bond zone. In one embodiment, for similar metals joints, bond zone is composed of equiaxed recrystallized grains. The bond zone is around microns, preferably near 5 microns or near 10 microns or 20 microns in size. In another embodiment, for dissimilar metal joints, the bond zone is sub-micron in size. The dissimilar metal contains a new crystal. In another embodiment, dissimilar metal joint does not contain new crystals. Due to the small bond zone relative to the foil stock size, bulk material property changes are negligible and identical to the incoming foil stock.

In an embodiment, UAM process has both additive and subtractive steps in arriving at a final part shape. In another embodiment, UAM has only additive step in arriving at a final part. In another embodiment, UAM has only subtractive step in arriving at a final part shape.

Figure 2A:
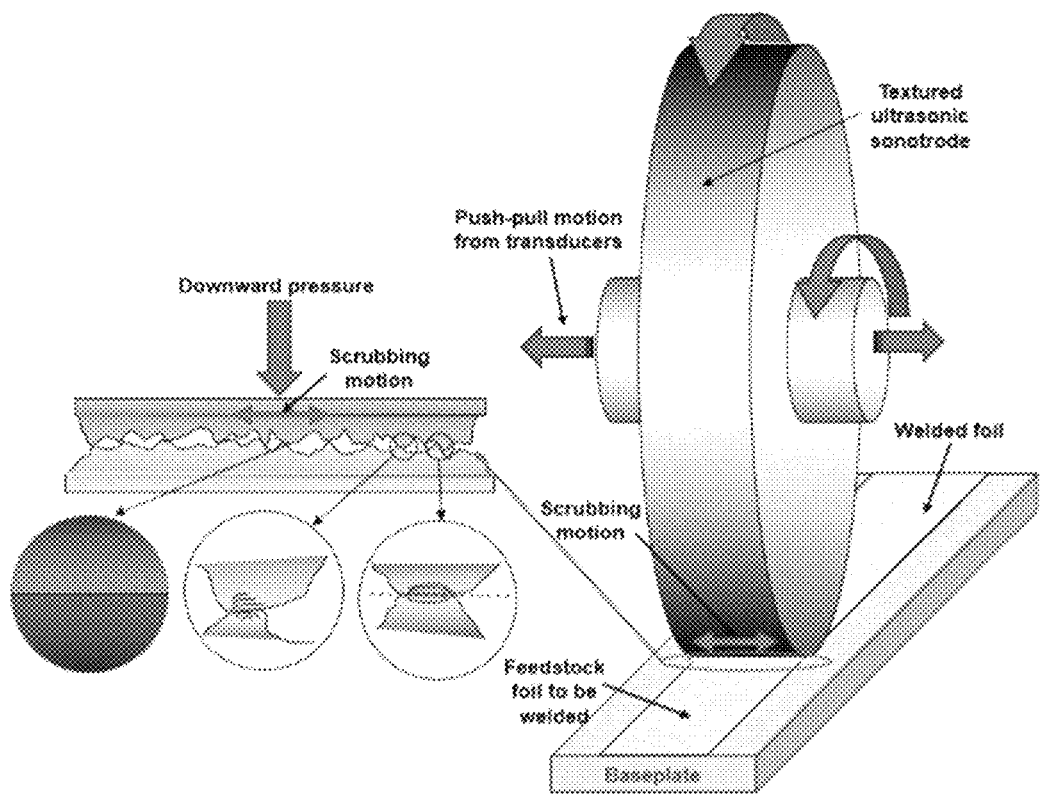
FIG. 2A shows UAM process: Additive stage.
Figure 2B:
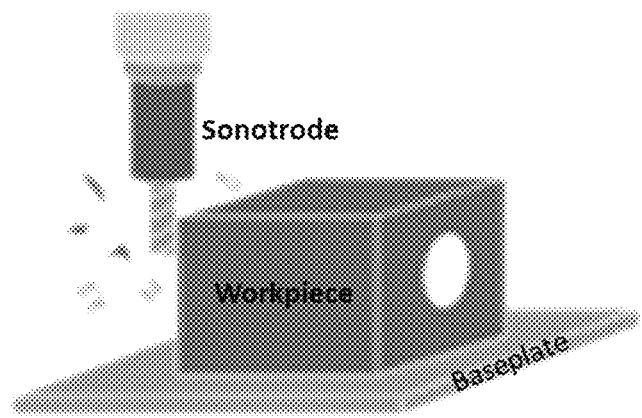
FIG. 2B shows UAM process: CNC subtractive stage.
Figure 3A:
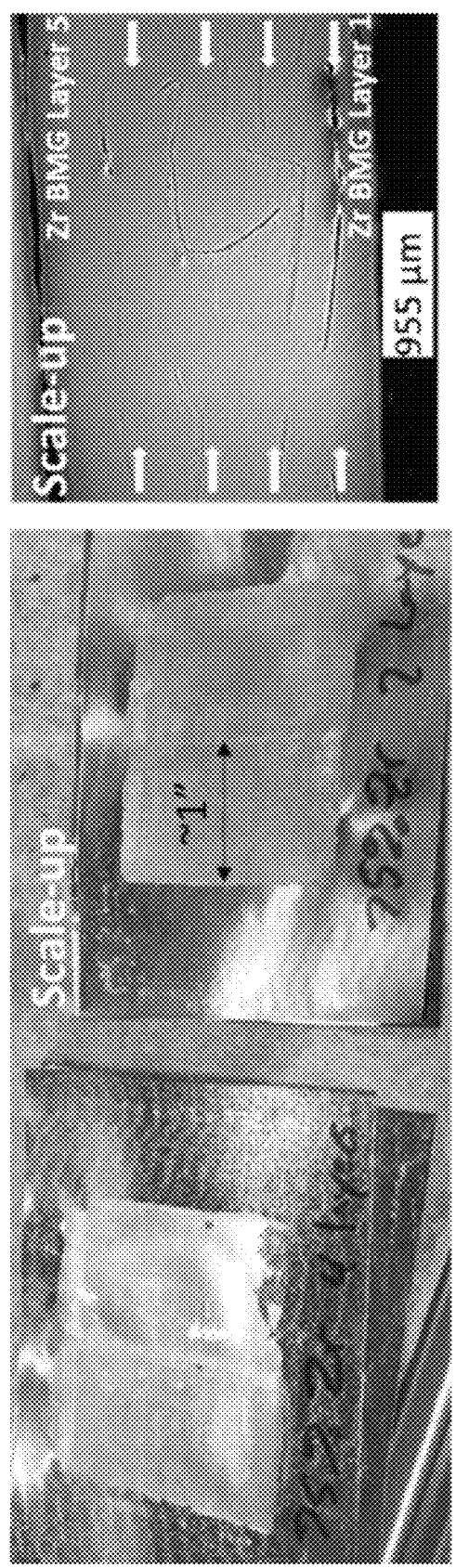
FIG. 3A shows a joined ZrCu-based BMGs with UAM.
Figure 3B:
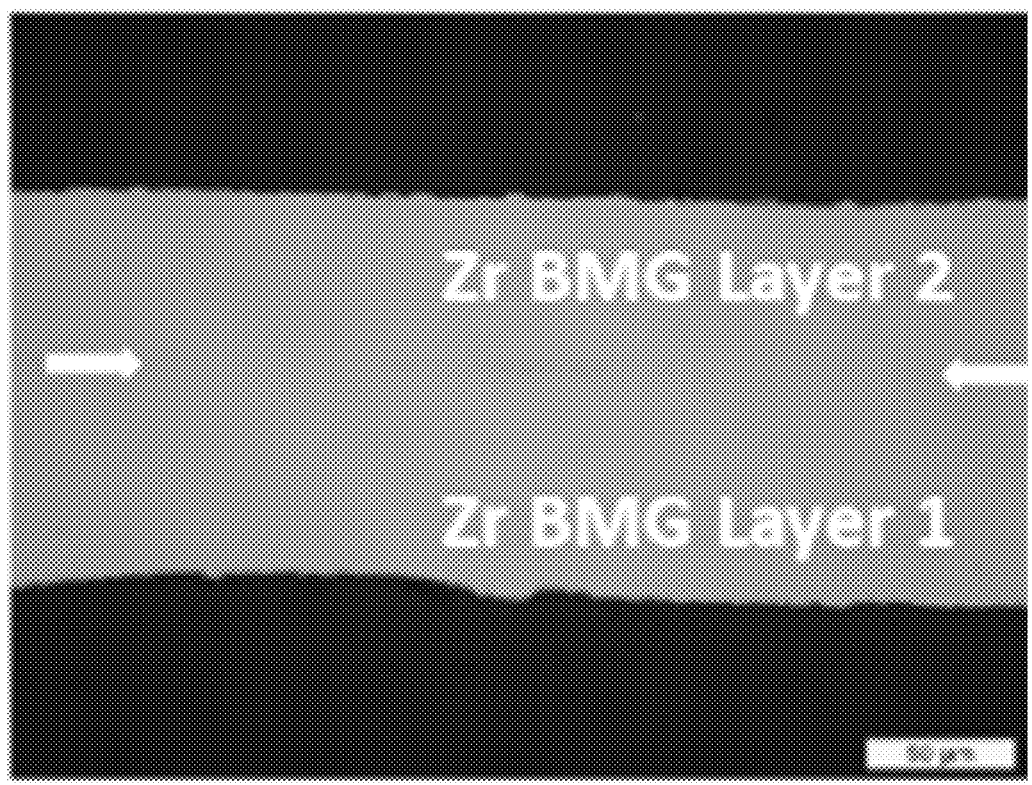
FIG. 3B shows the light microscopy of a cross-section of a ZrCu-based BMGs joint.

In an embodiment, the additive and subtractive stage of the UAM process is shown in FIG. 2A and FIG. 2B. FIG. 2A shows the additive stage of the UAM process, consisting of two ultrasonic transducers and a (welding) sonotrode. The vibrations of the transducer are transmitted to the disk-shaped welding sonotrode, which in turn creates an ultrasonic solid-state weld between the thin metal tape/foil or like and base plate. The continuous rolling of the sonotrode over the plate welds the entire tape/foil or like to the plate. During the build, periodic machining operations add features to the part. FIG. 2B shows subtractive stage to remove excess tape/foil or like material and true-up the top surface for the next stage of welds. Thus, the additive manufacture (AM) process involves both additive and subtractive steps in arriving at a final part shape. This technology is patented by Fabrisonic.

In an embodiment, UAM is used to create dissimilar metal laminate composites or clad metal surfaces. In an embodiment, dissimilar metal composites created using UAM are composed of a soft ductile material and a harder brittle material to create tailorable mechanical response. In an embodiment, cladding of surfaces begins by joining hard, wear-resistant metals to softer underlying structure.

In an embodiment, UAM is used to clad of hard metals to hard metals.

In an embodiment, UAM metallically join BMG foils to other BMG foils with suppressed crystallinity formation. In other embodiment, UAM create dissimilar BMG laminate metal composites and clad metal surfaces with BMGs using metallic joints. In an embodiment, interface of BMG is remedied by cladding aluminum with BMGs.

In an embodiment UAM is used for processing of novel materials and manufacturing complex-shaped parts. In an embodiment, UAM reduces in part manufacturing. UAM is particularly suitable for the manufacture of products with complex features using traditionally difficult-to-process materials without the use of traditional tools, such as molds or dies.

In an UAM is also referred to as 3D printing. UAM is a cladding layer-by-layer technique of producing three-dimensional (3D) objects directly from a digital model.

In an embodiment, UAM is creates more ductile and fracture resistant BMG structures. In an embodiment ductile and fracture resistant BMG structures is formed via composite theory.

In an embodiment, enhanced ductility and fracture toughness will come from other metals used in the laminate or base metal as cladding. In an embodiment, UAM join BMG foils to alternative metals. The no high temperature chemistry in UAM allows multi-material joining. In an embodiment, UAM clad surfaces and fabricate dissimilar metal laminate composites without formation of new phase.

In an embodiment, UAM clad surfaces and fabricate dissimilar metal laminate composites. In an embodiment, UAM clad surfaces and fabricate dissimilar metal laminate composites without formation of new phase.

In an embodiment, UAM clad surfaces and fabricate dissimilar metal laminate composites, There is no shift in transformation temperatures or change in heat transfer, which implies little to no formation of new phases.

In an embodiment, UAM provides a method to ease fabrication. BMG casting is tricky and requires special fixtures for fabrication and post process machining that are time expensive and costly to make. UAM allows to be built without the complicated fixtures and in-place machining operations to expedite and simply finishing. i.e., no additional fixtures or referencing.

In an embodiment a method to decrease in fracture toughness and ductility of BMG is provided. In an embodiment a method to form a more ductile metal composite comprise mixing cast BMG foils with more ductile alloys is provided.

In an embodiment, UAM process avoid material damage.

In an embodiment, UAM produced metal composites has a solid-state nature.

In an embodiment, BMG alloys is manufactured in thin foil form. In an embodiment, BMG alloys is manufactured in thin foil form for cladding applications.

In an embodiment, the surface of BMG alloy is modified. In an embodiment, the surface of BMG foil is modified. In an embodiment, the surface of rolled BMG foil is modified. In one embodiment, the modification of the surface is to remove oxygen content. In another embodiment, the modification of the surface is to flatten the foil. The foils with thicker oxide scales and flatness variation have been challenging to weld. In one embodiment, the surface of BMG foils can be modified using commercially available cleaning technologies to enable joining for certain BMG alloys. Thick oxide layers restrict bonding in certain cases. The surface modification removes thick oxide layers which limits bonding in some cases.

In an embodiment, surface modification is done by various techniques but not limited to laser system, energy beams, periodic reverse electrocleaning (PRC) or any similar. In an embodiment, surface modification is done by a Laser system. The laser system is similar to P-Laser system. The laser system that uses laser energy to remove the oxide layers from the metal substrates. The oxide layer absorbs the laser energy very well, while the pure metal or BMG reflects most of the energy. The laser used will be pulsed on the surface with a frequency of about 200,000 pulse/s.

In an embodiment, surface modification is done using energy beams. The energy beams are Plasma or E-beam energy sources, that use either plasma or E-beam source to sputter the oxide layers and leave an oxide free foils ready to be solid-state welded In an embodiment, surface modification is done using periodic reverse electrocleaning (PRC). PRC removes oxides and scales from metallic alloys. The etching is made alternately cathodic and anodic using DC current.

In an embodiment, UAM process comprises breaking of the surface oxide layers through scrubbing at the surfaces. The scrubbing is between the weld foils and tooling. The scrubbing forms nascent metal-to-metal surface contacts, which creates a solid-state bond between the foils.

Figure 5:
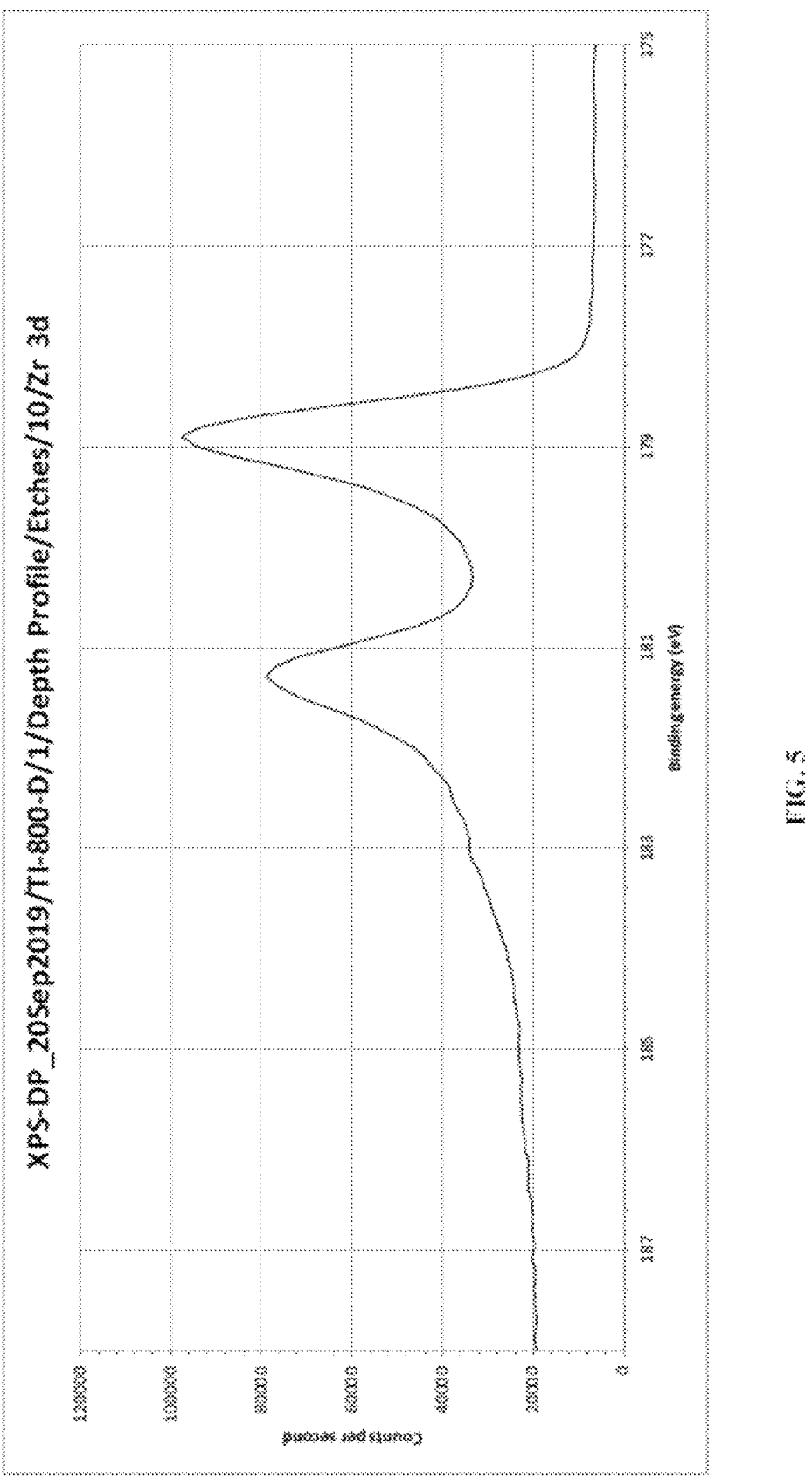
FIG. 5 shows an example of the XPS spectra pattern.

In an embodiment, UAM creates a solid-state bond between the foils after the oxide scale is broken through via the scrubbing action between the top foil and bottom foil surfaces. In an embodiment, oxide scale characterization of foil is performed using but not limited to a high-performance multi-technique surface science instrument combining high-sensitivity X-ray photoelectron spectroscopy (XPS) with a dual anode Al/Ag monochromatic X-ray source, high resolution scanning field emission Auger electron spectroscopy and microscopy (AES, SAM), ultraviolet photoelectron spectroscopy (UPS), ion scattering spectroscopy (ISS) and reflection electron energy loss spectroscopy (REELS). The FIG. 5 shows an example of the spectra pattern to analyze oxygen scale thickness.

In an embodiment, the oxide scale thickness is determined using the following equation:

$$t_{oxide} = \lambda_{oxide} \cdot \sin\theta \cdot \ln\left[\left(\frac{I^{\infty}_{base}}{I^{\infty}_{oxide}} \frac{I^{exp}_{oxide}}{I^{exp}_{base}}\right) + 1\right],$$

where $\lambda_{oxide}$ is the attenuation length, $\theta$ is the angle between the sample surface plane and the electron analyzer and the Is are the measured peak intensities.

Figure 8A:
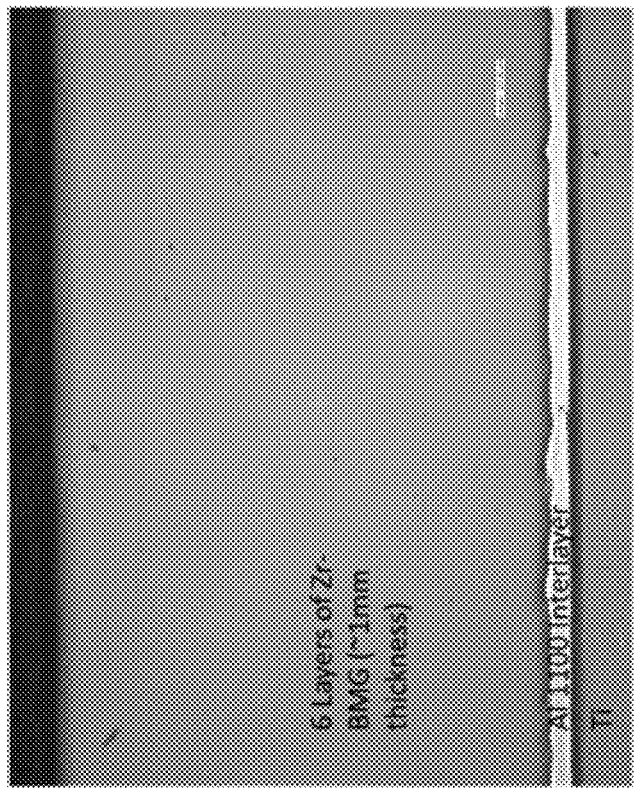
FIG. 8A shows a 1 mm thick BMG cladding with UAMs. Multiple passes can be carried out for scale-up. Crystalline metals evaluated were aluminum alloys, titanium alloys and steel.
Figure 8A:
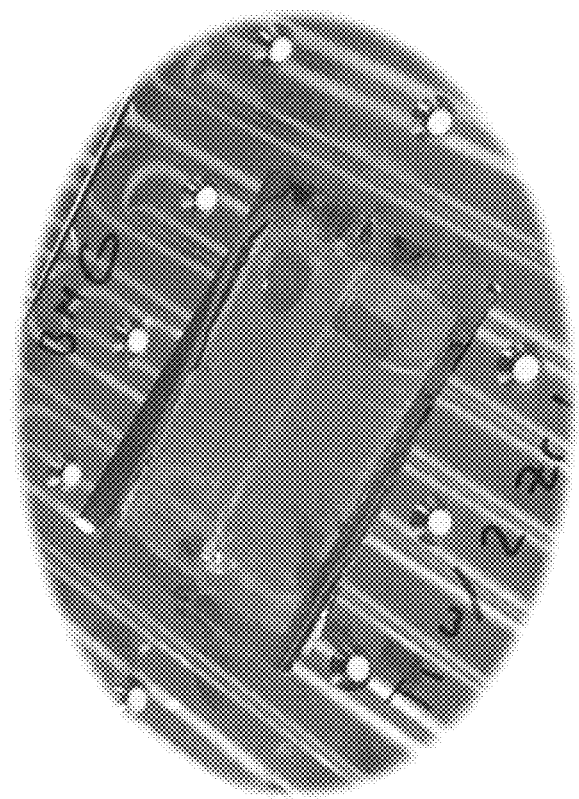

In an embodiment, UAM process comprises various BMG alloys. In an embodiment, UAM process comprises various BMG alloys and amorphous materials. In an embodiment, UAM process comprises various BMG alloys and crystalline materials. In an embodiment, the UAM process uses but not limited to ZrCu based BMG alloys, aluminum alloys, and titanium alloys. The FIG. 8A shows joining ZrCu-based BMGs with UAM.

In an embodiment, UAM process comprise various parameters. These parameters include but not limited to linear travel speed, tool pressure or down force, and oscillation amplitude and etc.

In an embodiment, the UAM process is used for scale-up. In an embodiment, various combination of composite and cladding for scale-up is selected using a go/no go screening approach. The process of ultrasonic welding of amorphous thin foils can be conducted according to information and data from the US Patent US 20140312098; which is incorporated herein in entirety.

In an embodiment, UAM creates weld joint between the BMG alloy and crystalline metal. In an embodiment, the weld joint is similar, between the BMG alloy and crystalline metal. In an embodiment, the weld joint is dissimilar, between the BMG alloy and crystalline metal.

In an embodiment, the crystallinity between BMG alloy foils is quantified. The quantification of crystallinity between BMG alloy foils is done by techniques such as but not limited to x-ray diffraction (XRD), electron backscatter diffraction (EBSD), energy dispersion spectroscopy (EDS), tunneling electron microscopy (TEM), Scanning Electron Microscopy (SEM) or any similar. The quantification of crystallinity between BMG alloy foils is done by techniques but not limited to EDS, EBSD, if crystallinity is expected from the dissimilar metal joint.

In an embodiment, UAM is used for several BMG alloys cladded to various crystalline substrates. In an embodiment, multiple BMG alloys is cladded to various crystalline substrates has little to no crystallinity or intermetallic phase formation. The TEM near the interface region of a BMG foil interface found limited and disjoint nanocrystals less than <1 micron in size. Prior cladding work with laser is composed largely of crystal structures, which limits integrity and system robustness long term.

In an embodiment, compatibility of BMG with UAM is evaluated. In an embodiment, compatibility of BMG with UAM is evaluated using consolidation qualities between foils. The consolidation quality between foils is but not limited to void density.

In an embodiment, compatibility of BMG with UAM is studied using but not limited to high power microscopes, optical microscopic characterization or similar. Little to no voids and the absence of crystal lattice patterns implies a well consolidated amorphous joint.

In an embodiment, mechanical testing is performed on multi-layer components to measure but not limited to interlaminar bond strength and tensile properties. In an embodiment, mechanical testing evaluates mechanical properties scale with part size. In an embodiment, mechanical testing is used to compare within UAM BMG parts, compare between UAM BMG to BMG foil stock or combination thereof.

In an embodiment, mechanical testing parameters included but not limited to tensile testing, shear, fatigue, and interlaminar bond strength.

Figure 4:
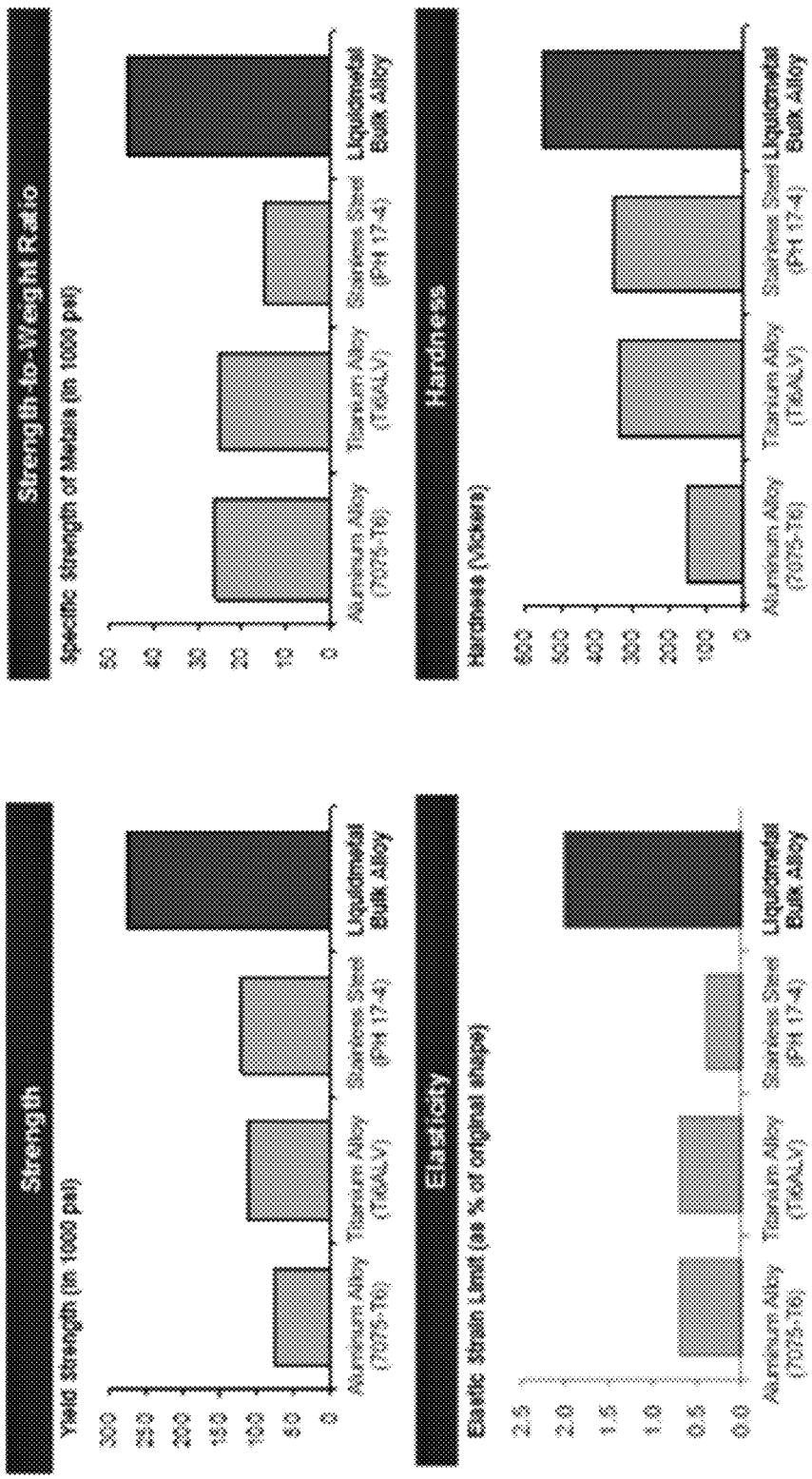
FIG. 4 shows mechanical properties of amorphous metals.

In an embodiment, the interlaminar bond strength or out-of-plane strength is investigated by not limited to push-pin testing. Push-pin testing is a comparative test to help steer 3D printing parameter development for new metal combinations and alloys. The test is also useful for evaluating interlaminar bond strength without building a tall build. The test works by pushing on 3D printed material with a pin fed through a bind hole in the baseplate. This pin is then loaded and pushed through the sample until failure occurs. The build failure is insightful to the interlaminar bond strength. The data curves from the push pin test can be used to benchmark against other weld metals and to gauge strength In an embodiment, the amorphous metal coatings and bulk materials has high strength, high toughness. In an embodiment, the amorphous metal coatings and bulk materials has superior wear and corrosion resistance with material costs two to five times lower than Ti- and Ni-based alloys. In an embodiment, amorphous metals are better than conventional metals in every aspect as shown in FIG. 4.

In an embodiment relates to joining of various BMG alloys. In an embodiment relates to joined different BMG alloys and that joints were amorphous In an embodiment, UAM specimens exceed the critical casting thickness of the material by a factor of 15 or more in all dimensions. Despite decreasing quench effect with increasing build thickness, x-ray diffraction analysis suggests that a fully amorphous structure was maintained throughout the build. In an embodiment, a low concentration of sparsely distributed nano-grain clusters could be present. Techniques such as but not limited to high-resolution electron backscatter diffraction scan can be used to evaluate the clusters.

The embodiments relate to novel applications of metallic glasses achievable through appropriate material design and optimization of existing additive manufacturing processes.

An embodiment relates to elimination of microcracking that is present due to a build-up of stresses during rapid solidification.

In an embodiment, cladding custom engineering solution is provided. An embodiment works with new metallic combinations to create new materials with properties not available through monolithic metals.

In an embodiment, UAM is used to clad print exotic materials such as but not limited to tantalum, europium, tungsten as well as mainstream alloys such as but not limited to aluminum copper and steel or combination thereof.

In an embodiment, the UAM metals composite comprising amorphous metal components can redefine the design paradigm of materials and components. The metal composites of UAM is 2 to 10 times better performance in several applications of the Defense and Aerospace industries. In an embodiment, UAM metals composite comprising amorphous metal components can be used for aerospace structure parts. UAM metal composites would enable pursuing applications which were beyond the reach of traditional materials.

In an embodiment, UAM poses ability to have tighter production control over mission-critical components. In an embodiment, UAM poses ability to print components for legacy aircrafts/vehicles or similar.

In an embodiment UAM additive manufacturing of Amorphous Metals would turn a new page in U.S. based manufacturing by enabling UAM metal composite to last longer, helping reduce $CO_2$ emissions caused during manufacturing of metal and composites, enabling production of precise and multifunctional, unique components directly and indirectly leading to reduced energy consumption and massive economic savings.

The embodiments herein have application in aerospace companies. AM more preferably UAM avoids the up-front costs, long lead times, and design constraints of conventional high-volume manufacturing techniques like injection molding, casting, and stamping. Aerospace companies often need parts with complex geometries to meet tricky airflow and cooling requirements in jammed compartments. The nanostructured materials with low density and unique properties that make the parts both hard and tough coupled with excellent corrosion- and wear-resistance would enable these materials to be the ideal choice for AM in multiple applications.

Metal 3D printing has been widely adopted by several high value industries, e.g., aerospace and medical. Many of these industries also utilize BMGs in niche applications to leverage BMG properties, e.g., coatings, thin high deformation components, etc. These industries have been resilient to combine metal Amorphous and BMGs due to the printed structure not being amorphous and having defects. The embodiments herein allow combination of BMG and amorphous metals, which could be used in various application but not limited, as shown in Table 1.

TABLE 1

| Applications of the embodiments in various fields. | |
|---|---|
| Fans and compressor section of turbine engines | Several applications requiring high strength and superior corrosion resistance |
| Other engine components (blades, disc, hubs, inlet guide vanes and cases) | in energy, desalinization, power, paper, automotive. |
| Hypersonic vehicles (scramjet inlet flap) | Sporting Goods (Gears for bikes, golf clubs), Electronic and watch casing |
| Bearings | |
| Impellers | |
| Fuel nozzles | |
| Gears | |
| Struts | |
| Springs | |
| Hydraulics systems | |

The embodiments herein can be used to provide amorphous alloys with enhanced properties and functionality similar to Grade 4/5 Titanium. The embodiments relate to 3D Printed BMG alloys.

The embodiments are illustrated by the following working examples in which all parts and amounts are by weight unless otherwise stated. The following examples as described are not intended to be construed as limiting the scope of the embodiments.

WORKING EXAMPLES

Example 1: BMG Alloys Used in Embodiments Herein

The BMG alloys used in embodiments herein are shown in the Table 2. The thickness of the foils varied between.

TABLE 2

BMG alloys used in UAM with their composition and number of layers.

| Sample | BMG Alloy | BMG Alloy Composition |
|---|---|---|
| 1 | ZrCuNiAl | Zr(75.72%)Cu(14.2%)Ni(2.5%)Al(2.5 8%) |
| 2 | ZrTiNiCuHf | Zr(64.5%)Ti(14.7%)Ni(12.6%)Cu(7%)Hf(1.2%) |
| 3 | ZrTiNiHf | Zr(61.7%)Ti(17.3%)Ni(20%)Hf(1%) |
| 4 | ZrCu | Zr (50%)Cu (50%) |
| 5 | ZrCuNiAlTi | Zr(65.7%)Cu(15.5%)Ni(11.7%)Al(3.7%)Ti(3.3%) |
| 6 | NiSiBC | Ni(91.74%)Si(4.5%)B(3.7%)C(0.06%) |
| 7 | NiPC | Ni(91.74%)P(11%)C(0.1%) |
| 8 | CoFeNiMoBSi | Co(69%)Fe(4%)Ni(1%)Mo(2%)B(12%)Si(12%) |
| 9 | TiZrCuNi | Ti(40%)Zr(20%)Cu(20%)Ni(20%) |
| 10 | TiCrCuNi | Ti(40%)Cr(20%)Cu(20%)Ni(20%) |
| 11 | NiCrFeSiBPMo | Ni(42.5%)Cr(16%)Fe(32%)Si(1.5%)B(0.5%)P(6%)Mo(1.5%) |

Three different materials have been tested as substrates to evaluate cladding potential. These alloys were selected due to their common use in aerospace applications: Steel, e.g., 4140 steel; titanium, e.g., Ti grade 3; and aluminum, e.g., Al 6061.

Figure 6:
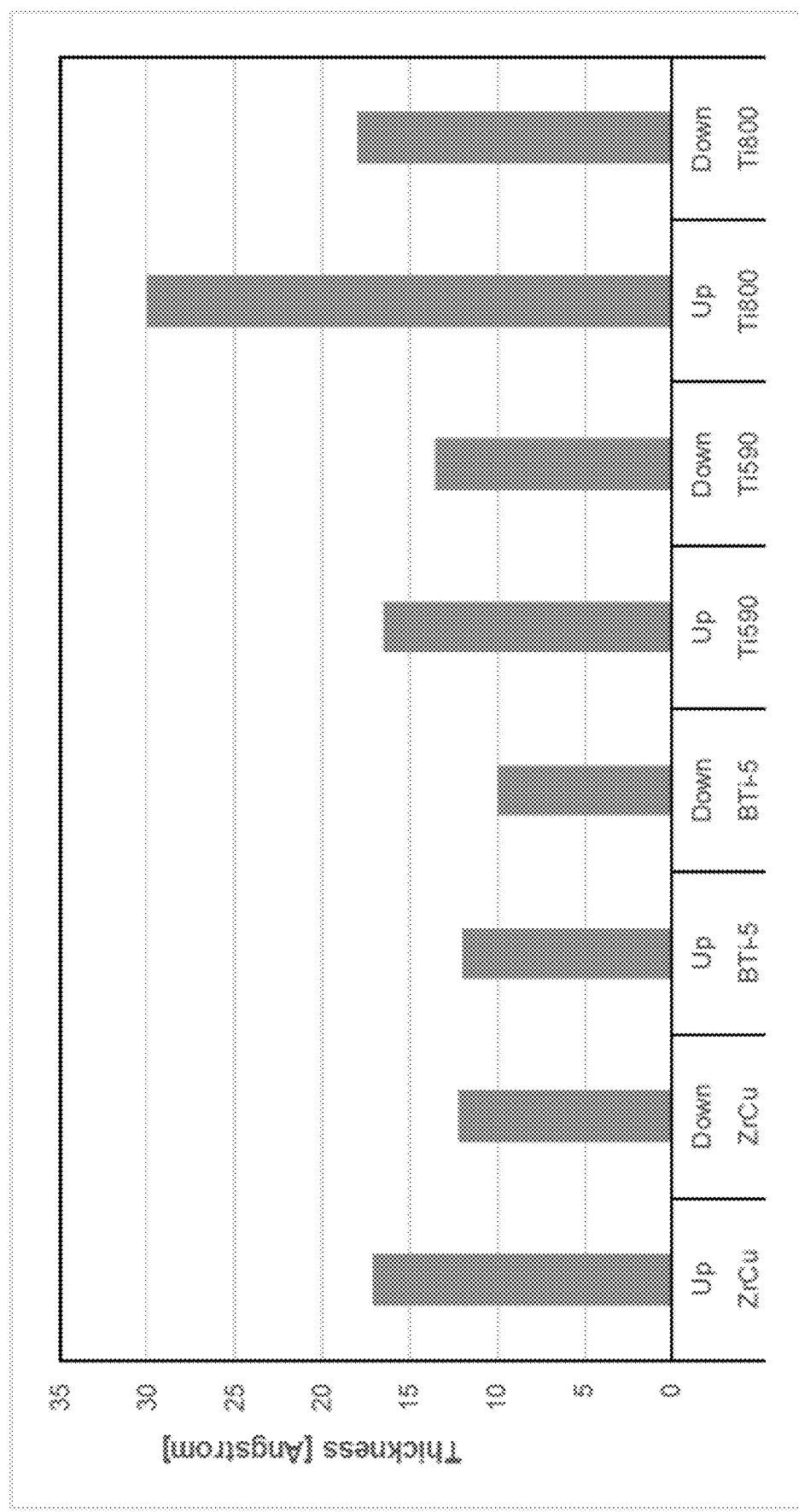
FIG. 6 shows measured oxide layer thicknesses on both sides of foils for UAM.

The development began with feedstock characterization and UAM process optimization. The FIG. 6 shows that one side of the foils has higher oxygen content than the other one. The foils were manufactured using melt spinning process. During this process, the molten alloy is squeezed through the nozzle using pressure onto the surface of a rapidly rotating copper wheel. The melt solidifies instantly. The side that is in contact with the air looks shiny and is expected to have a thicker oxide scale than the side in contact with the copper wheel.

Figure 7:
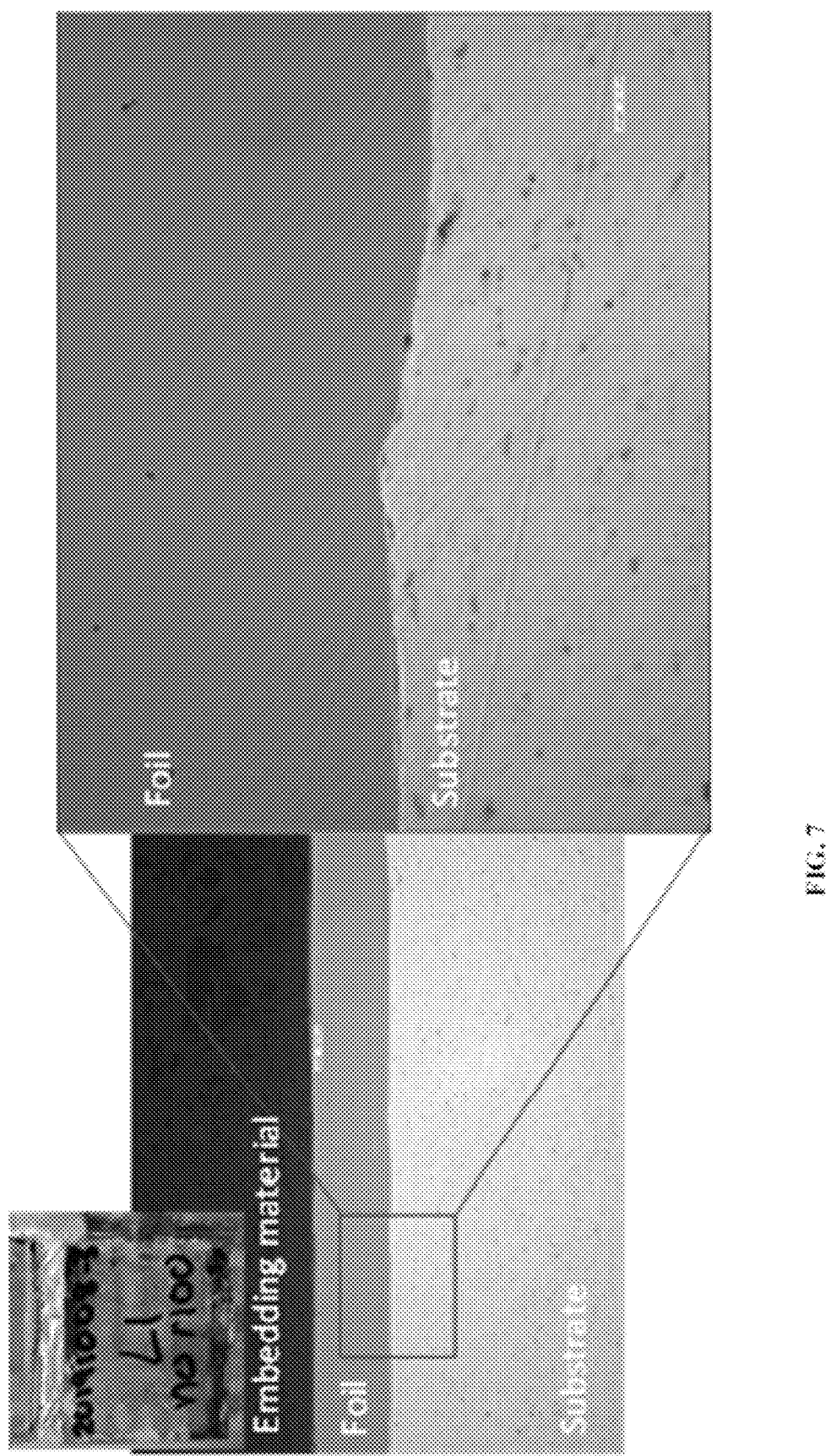
FIG. 7 shows cladding crystalline metals with amorphous alloys in UAM without using soft interlayers.

Example 2: Cladding Crystalline Metals with Amorphous Alloys in UAM Without Using Soft Interlayers The Ti based amorphous alloys was cladded with Aluminum. The result is shown in FIG. 7. The result shows that bond is strong.

Figure 9:
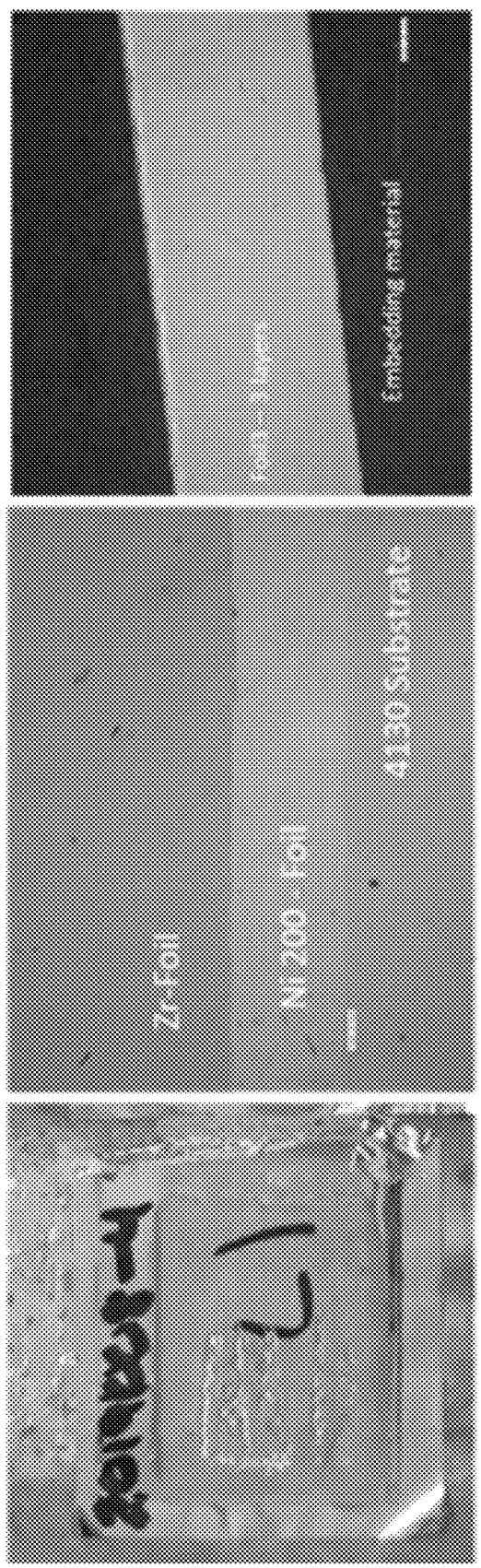
FIG. 9 shows cladding of 4130 alloy steel substrate with Zr based alloys. Ni 200 is used when joining the initial layer using UAM.

Example 3: Cladding Crystalline Metals with Amorphous Alloys in UAM Using Soft Interlayers The other substrates including Titanium and steel, BMG bond strength was weak and alloys cracked. To remedy this transition joint challenge, an intermediary alloy layer is used. For aluminum and Ti, 0.001" thick Al 1100 is used. UAM processing parameters were 6000N down force, 50 in/min travel speed, and 36 microns scrubbing amplitude. Joints between crystalline metals and amorphous alloys using Al 1100 are shown in FIG. 9.

Figure 8B:
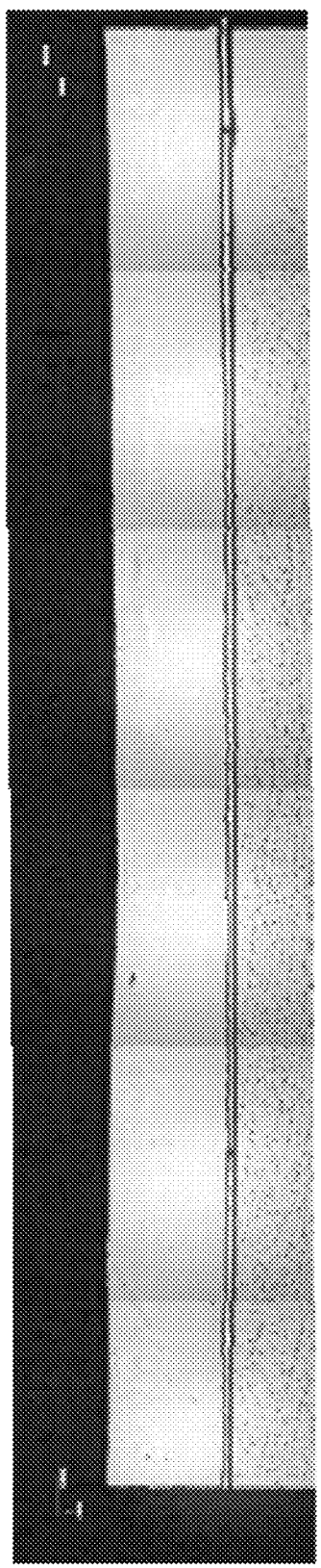
FIG. 8B shows the light microscopy of a cross-section of 1 mm thick BMG cladding.

Example 4: Zr Based BMG Alloy Foils were UAM Processed onto Titanium Substrate Six separate layers were joined onto the Titanium substrate to reach a total thickness of about 1 mm. The result is shown in FIG. 8B. The interfaces between foils cannot be seen other than the joint between layer 5 and 6. No defects, porosity or voids have been detected along the cladding. Very good adhesion and cohesion have been observed. Multiple BMG foils can be added to a structure to create a tailorable thickness. It is possible to create a structure larger than the critical casting thickness. Ti and Steel baseplates had similar processing parameters, Al required more scrubbing amplitudes due to stiffness mismatch.

Example 5: The Processing Parameters for All Alloys

The processing parameters for all alloys evaluated is summarized in the Table 3. The processing parameters are consistent and reproducible. Processing differences originate in the mechanical properties of the crystalline substrates, i.e., the more flexible the substrate, the more weld amplitude is required. Qualitatively, the bonds between BMG alloys were very similar between the different crystalline materials.

TABLE 3

The processing parameter of alloys cladded on the substrates using UAM.

| Cladded Composite | Composition | Substrate Material | No. of Layers | Foil Thickness [μm] | Total Cladding Thickness [mm] | Amplitude [μm] | Load [N] | Speed in inch per minute [ipm] |
|---|---|---|---|---|---|---|---|---|
| 1 | Zr(75.72%)Cu(14.2%)Ni(2.5%)Al(2.58%) | Steel | 1-5 | 80 | 0.08-0.4 | 33-37 | 2,500-4,000 | 50-150 |
| 2 | Zr(75.72%)Cu(14.2%)Ni(2.5%)Al(2.58%) | Aluminum | 1-3 | 200 | 0.2-0.6 | 33-37 | 2,500-4,000 | 50-150 |
| 3 | Zr(75.72%)Cu(14.2%)Ni(2.5%)Al(2.58%)+Ni foil as bond layer | Steel | 1-4 | 200 | 0.2-0.8 | 33-37 | 2,500-4,000 | 50-150 |
| 4 | Zr(75.72%)Cu(14.2%)Ni(2.5%)Al(2.58%) | Steel | 3 | 200 | 0.6 | 33-37 | 2,500-4,000 | 50-150 |
| 5 | Zr(75.72%)Cu(14.2%)Ni(2.5%)Al(2.58%) | Titanium | 6 | 200 | 1.2 | 33-37 | 2,500-4,000 | 50-150 |
| 6 | Zr(64.5%)Ti(14.7%)Ni(12.6%)Cu(7%)Hf(1.2%) | Aluminum | 1-3 | 60 | 0.06-0.18 | 33-37 | 2,500-4,000 | 50-150 |
| 7 | Zr(64.5%)Ti(14.7%)Ni(12.6%)Cu(7%)Hf(1.2%) | Steel | 1-3 | 60 | 0.06-0.18 | 33-37 | 2,500-4,000 | 50-150 |
| 8 | Zr(61.7%)Ti(17.3%)Ni(20%)Hf(1%) | Aluminum | 1-3 | 60 | 0.06-0.18 | 33-37 | 2,500-4,000 | 50-150 |
| 9 | Zr(61.7%)Ti(17.3%)Ni(20%)Hf(1%) | Steel | 1-3 | 60 | 0.06-0.18 | 33-37 | 2,500-4,000 | 50-150 |
| 10 | Zr(50%)Cu(50%) | Steel | 1-4 | 100 | 0.1-0.4 | 30-37 | 3,500-4,000 | 100-150 |
| 11 | Zr(50%)Cu(50%) | Titanium | 1-4 | 100 | 0.1-0.4 | 30-37 | 3,500-4,000 | 100-150 |
| 12 | Zr(65.7%)Cu(15.5%)Ni(11.7%)Al(3.7%)Ti(3.3%) | Steel | 1-5 | 90 | 0.09-0.45 | 30-40 | 2,500-4,000 | 50-150 |
| 13 | Ni(91.74%)Si(4.5%)B(3.7%)C(0.06%) | Steel | 1-5 | 35 | 0.035-0.175 | 30-40 | 2,500-4,000 | 50-150 |

TABLE 3-continued

The processing parameter of alloys cladded on the substrates using UAM.

| Cladded Composite | Composition | Substrate Material | No. of Layers | Foil Thickness [μm] | Total Cladding Thickness [mm] | Amplitude [μm] | Load [N] | Speed in inch per minute [ipm] |
|---|---|---|---|---|---|---|---|---|
| 14 | Ni(91.74%)P(11%)C(0.1%) | Steel | 1-5 | 35 | 0.035-0.175 | 30-40 | 2,500-4,000 | 50-150 |
| 15 | Co(69%)Fe(4%)Ni(1%)Mo(2%)B(12%)Si(12%) | Steel | 1-5 | 75 | 0.075-0.375 | 30-40 | 2,500-4,000 | 100-150 |
| 16 | Ti(40%)Zr(20%)Cu(20%)Ni(20%) | Aluminum | 1-10 | 70 | 0.07-0.7 | 30-40 | 2,500-4,000 | 50-150 |

Example 6: Characterization of the UAM Cladded Foils

In an embodiment, Interface between the foil layers and any defects were analyzed through the light microscopy to understand the influence of the process parameters into the additive manufacturing of these foils and evaluate the overall quality of the cladding layers as well as the degree of the bonding and type of the defects. In addition, measurements of the final stack heights were performed to determine the average thick ness reduction of the foils after the UAM process. Furthermore, Sectioning of the samples was performed using water-cooled abrasive saw following by mounting. The cut samples were clamped using sample clips before mounting. Samples were ground, coarse polished and final polished sequentially with 400, 600, and 800 grit SiC papers in water, followed by 1200 grit SiC paper in ethanol to minimize surface pitting. Samples were polished using 6 μm, 3 μm, and finally 1 μm diamond composite polishing cloth with diamond compound extender as lubricant. FIG. 9 displays the optical micrographs of UAM treated samples. It is showing that all currently tested alloys are considered "feasible" for the UAM process. The one-layer cladding of amorphous alloys demonstrated strong consolidation. In FIG. 9, Ni 200 is used when joining the initial layer. The 3 layers stack of amorphous alloys demonstrated strong consolidation.

Example 7: EBSD Analysis

In an embodiment, EB SD analysis has been conducted on some of the samples to see if there is any crystallization of the interface after UAM processing, since its crystallized interfaces could be hard and reduced the likelihood of the build-up. To analyze the microstructural changes in the interface as well as in the foil bulk after UAM processing, Electron Backscatter Diffraction (EBSD) was used. EBSD gives crystallographic information including crystal structure and orientation from Kikuchi diffraction patterns. Sample of the cladded 4130 alloy steel with 3 layers of Zr based alloys using Ni 200 as initial joining foil was evaluated using EBSD. The sample was analyzed at different areas in the bulk, interface and near the interface.

Figure 10:
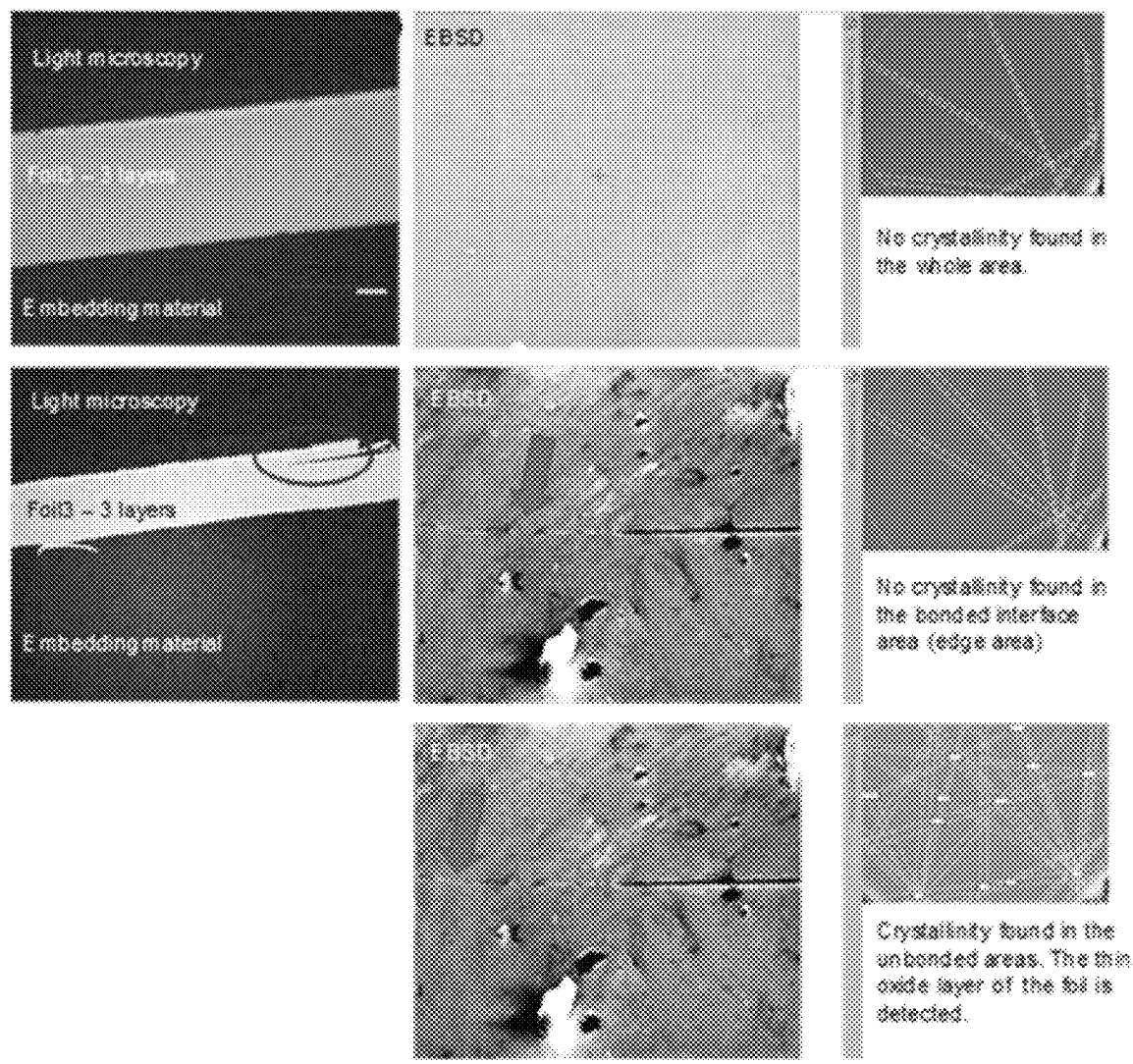
FIG. 10 shows EBSD results cladded 4130 alloy steel with 3 layers of Zr based alloys using Ni 200 as initial joining near the sublayer and in the bulk.

FIG. 10 shows the optical microscopy and EBSD of a jointed BMG interface. In all cases, we could not identify any Kikuchi patterns as shown in FIG. 10. The EB SD test results near the interface or the sublayer was similar to the bulk, meaning that the material is fully amorphous and no hard, brittle phases were generated. The FIG. 10 shows that crystalline phases were present only on the areas where the foils are not bonded to the substrate of the other foil. On those areas, the oxide layer of the foils is still not broken from UAM process to create the "cold" welding with the underlying layer. No new phase formation in the interface was observed.

Example 8: Mechanical Characterization

In an embodiment, interface strength was evaluated via push-pin testing. The testing found that the joints were strong relative to the bulk material. To measure the interlaminar bond strength or out-of-plane strength, the push-pin samples were manufactured. The test works by pushing on UAM processed sample with a pin fed through a bind hole in the baseplate. This pin is then loaded and pushed through the sample until failure occurs. The build failure is insightful to the interlaminar bond strength.

Figure 11:
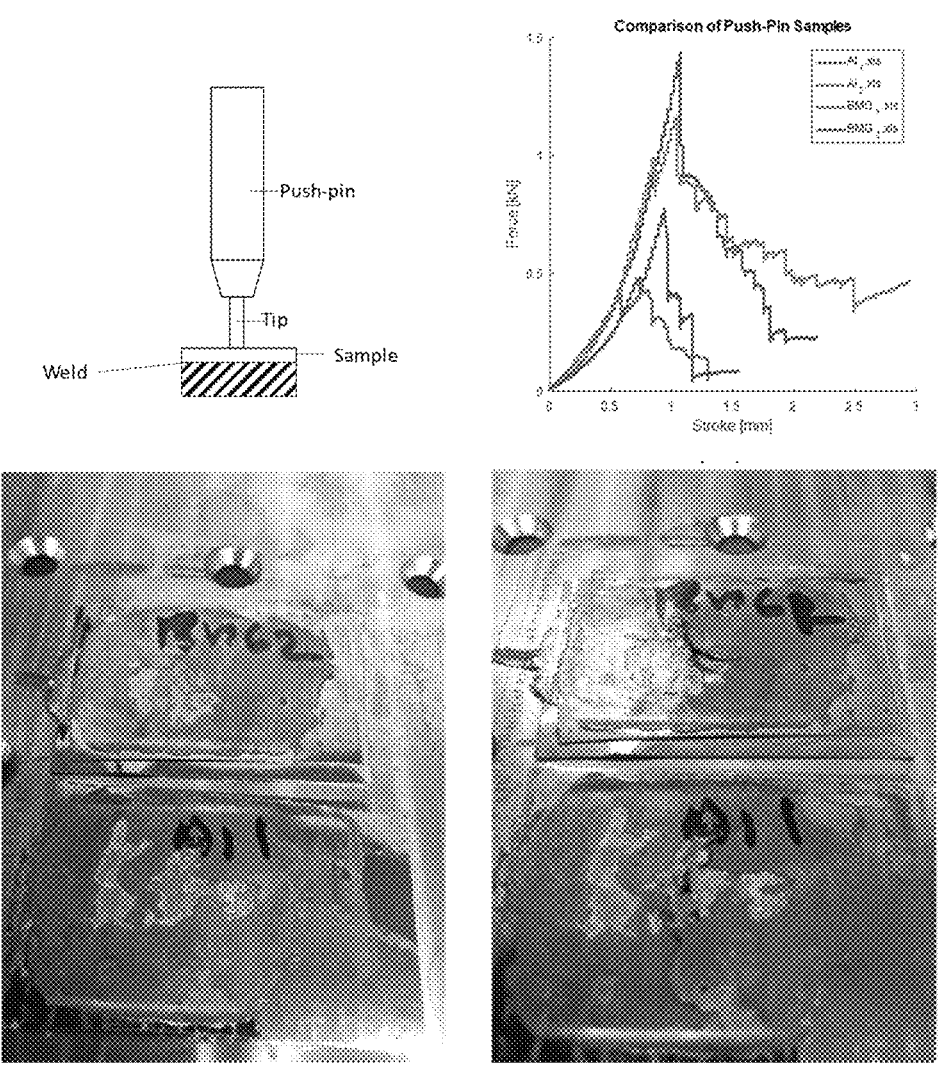
FIG. 11 shows Push-pin interface characterization. The test found that (i) the aluminum transition layer does not weaken the structure, and (ii) failure occurs through the deposit instead of along interfaces.

Using this test, base plates cladded with BMG with or without an aluminum bond layer were tested as shown in FIG. 11. Curves marked "BMG" correspond to the samples without bonding layer, while samples marked "Al" correspond to the samples with bonding layer. Data curves from the test showed that the bonding with or without bonding layer is similar. Two of the samples had defects created during drilling for the push-pin testing. As expected because of those defects, their bonding was less than the other samples (purple and red lines in the graph). The test found that (i) the aluminum transition layer does not weaken the structure, and (ii) failure occurs through the deposit instead of along interfaces.

Table 4 shows the differences in properties between parts cladded with UAM and other cladding processes.

TABLE 4

Differences in properties between parts cladded with UAM and other cladding processes.

| Process | Bonding | Structure | Porosity | Thermal Stress | Heat Affected Zone (HAZ) | Dilution | Strength | Corrosion Performance | Wear Performance | Surface Finish as Processed |
|---|---|---|---|---|---|---|---|---|---|---|
| Weld overlay | Metallurgical/ Strong | 100 % Crystalline | Very low (1-3%) | High (substrate stress over 700 MPa, cladding stress less than 500 MPa) | High (more than 0.03 inch) | High (3-8% on the surface, fully mixed in | Medium (steel 560-670 MPa) | Medium (because of high dilution) | Medium | Poor (rough) |

TABLE 4-continued

Differences in properties between parts cladded with UAM and other cladding processes.

| Process | Bonding | Structure | Porosity | Thermal Stress | Heat Affected Zone (HAZ) | Dilution | Strength | Corrosion Performance | Wear Performance | Surface Finish as Processed |
|---|---|---|---|---|---|---|---|---|---|---|
| Thermal Spraying | Mechanical/ Poor | Fully and partially amorphous (0-90% crystallinity) | Low (1-10%) | Very Low | No HAZ | the interface 25-50% dilution) No dilution (0%) | Medium | Medium (because of the porosity) | High | Medium-Good (100-500 microinches as sprayed) |
| Laser Cladding | Metallurgical/ Strong | Partially amorphous (20-100% crystallinity) | Very Low (1-2%) | Low (less than 200 MPa) | Very Low (0.02-0.03 inch) | Very Low (less than 3%) | Medium (steel 560-670 MPa) | High | High | Good (800-1,2000 microinches) |
| UAM | Metallurgical | Fully amorphous (~0% crystallinity | None (~0%) | No thermal stress (less than 50 MPa)/No distortion (~0%) | No HAZ (~0 inch) | No Dilution (~0%) | Very high (amorphous alloy 2,000-3,500 MPa) | Exceptional | Exceptional | Exceptional (40-80 microinches) |

UAM cladded part has: No thermal stress on substrate parts (no heat affected area) resulting in no distortion and no strain increasing product life; No fatigue reduction of the cladded parts; Superior corrosion resistance in severe environment (surface is fully amorphous); High Strength-to-Weight ratio; Superior surface characteristics and tribology performance.

Test Methodology:

Amplitude of UAM: The amplitude is defined as peak-to-peak displacement of the horn at its work face. The unit is micrometer.

Load: load is measured using a load cell.

Foil thickness: thickness of the foils was measured using image analysis technique of images obtained from light microscopy and SEM of mounted foils. Other techniques for foil thickness measurement include micrometer, caliper, stylus profilometry, interferometry, reflectometry, ellipsometry, spectrophotometry, ultrasound, advanced light focused microscopy, ion beam analysis, tomography, and others.

Total cladding thickness: total cladding thickness was measured using image analysis technique of images obtained from light microscopy and SEM of mounted foils.

Speed of UAM cladding: The MTI sensor measured the displacement of the sonotrode parallel to its vibration direction.

Crystallinity: the degree of crystallinity is determined using X-ray diffraction technique and is defined as the ratio of intensity from the crystalline peaks to the sum of the crystalline and amorphous intensities.

Porosity: porosity was measured using image analysis technique of images obtained from light microscopy and SEM of mounted samples Thermal stress: thermal stress is calculated by multiplying the change in temperature, materials thermal expansion coefficient and material's Young's modulus.

Distortion: mechanical gages are used to measure the part distortion

Heat affected zone: optical microscopy and image analysis were used to observe the heat affected zone of mounted and chemically etched areas.

Dilution: dilution is calculated from the proportion of base material in the cladding material. X-ray fluorescence (XRF) has been used to measure the elements concentration in base material and in the claddings.

Strength: strength is found by performing a tensile test.

Corrosion performance: ASTMB117 has been used for corrosion testing

Wear performance: ASTM G65 test has been used to analyze the wear performance.

Surface finish as processed: surface finish was measured using a profilometer and Ra has been reported.

Measurement of disjoint crystal: Transmission Electron Microscopy (TEM) and High-resolution SEM have been used to analyze the crystals.

PUBLICATIONS INCORPORATED BY REFERENCE

All publications and references, including patents and publications, cited herein the application are incorporated by reference in their entirety.

[1] S. Saunders, "NC State Researchers Successfully 3D Print Metallic Glass Alloys in Bulk," 23 Mar. 2018. [Online].

[2] S. Saunders, "Exmet AB's Amorphous Metals 3D Printing Technology Receives Investment Boost from AM Ventures, Accelerating Commercialization," 27 Mar. 2017. [Online].

[3] D. Hofman, P. Bordeenithikasem, S. Robers and A. Pate, "3D Printing of Bulk Metallic Glasses: Is it a Rebirth or the End of BMG Research," in TMS 2019, 2019

[4] Y. Li, Y. Shen, M. Leu and H. Tsai, "Mechanical properties of Zr-based bulk metallic glass parts fabricated by laser-foil-printing additive manufacturing," Materials Science and Engineering A, pp. 404-411, 2019.

[5] D. Hofmann, P. Bordeenithikasem, Z. Dawson, L. Hamill, R. Dillon, B. McEnerney, S. Nutt and S. Bradford, "Investigating bulk metallic glasses as ball-and-cone locators for spacecraft deployable structures," Aerospace Science and Technology, Vols. 82-83, pp. 513-519, November 2018.

[6] M. D. Demetriou, M. E. Launey, G. Garrett, J. P. Schramm, D. C. Hofmann, W. L. Johnson, R. O. Ritchie: A damage-tolerant glass, Nature Materials 10 (2011) 123-128.

What is claimed is:

1. An ultrasonic additive manufactured (UAM) product, comprising a cladded composite comprising a bulk metallic glass and a substrate;
wherein a thickness of the cladded composite is greater than a critical casting thickness of the bulk metallic glass; and wherein the bulk metallic glass and the substrate have an interface; wherein the interface has no Kikuchi pattern.

2. The UAM product of claim 1, wherein the thickness of the cladded composite is greater than the critical casting thickness of the bulk metallic glass by a factor of at least 15.

3. The UAM product of claim 1, wherein no interlayer is between the bulk metallic glass and the substrate.

4. The UAM product of claim 1, wherein the interface is amorphous.

5. The UAM product of claim 1, wherein the bulk metallic glass comprises Zr and Cu; wherein the substrate comprises steel, aluminum or titanium.

6. The UAM product of claim 1, wherein the bulk metallic glass further comprises Ni and Al.

7. The UAM product of claim 1, wherein the bulk metallic glass comprises Zr, Ti; wherein the substrate comprises steel, aluminum or titanium.

8. The UAM product of claim 1, wherein the bulk metallic glass comprises Ni, C; wherein the substrate comprises steel, aluminum or titanium.

9. The UAM product of claim 1, wherein the bulk metallic glass comprises Fe, Co; wherein the substrate comprises steel, aluminum or titanium.

10. The UAM product of claim 8, wherein the bulk metallic glass further comprises P or Si.

11. The UAM product of claim 9, wherein the bulk metallic glass further comprises Mo, B, Si, wherein a cladding layer comprises a foil comprising the bulk metallic glass on the substrate, wherein the foil having a foil thickness of about 20-300 μm and the cladding layer has a thickness of about 0.03 mm to 5 mm.

12. The UAM product of claim 1, wherein the cladded composite comprises a cladding layer of the bulk metallic glass; wherein the bulk metallic glass comprises approximately 0-10% crystallinity, no porosity, less than 50 MPa thermal stress, no heat affected zone, no dilution, and a bond strength of about 2,000-3,500 MPa.

13. The UAM product of claim 12, wherein the cladding layer comprises a foil comprising the bulk metallic glass on the substrate, wherein the foil having a foil thickness of about 20-300 μm.

14. The UAM product of claim 13, wherein the cladding layer comprises multiple sheets of the foil.

15. The UAM product of claim 13, wherein the cladding layer has a thickness of about 0.02 mm to 5 mm.

16. The UAM product of claim 12, wherein the cladding layer has a thickness of about 0.02 mm to 5 mm.

17. The UAM product of claim 12, wherein the cladding layer comprises a foil having a foil thickness of about 20-300 μm; wherein the cladding layer has a thickness of about 0.1 mm to 0.4 mm.

18. The UAM product of claim 12, wherein the cladded composite comprises a bond layer between the substrate and the cladding layer.

* * * * *